Sept. 22, 1970 R. D. SMITH 3,530,439
COMPUTER MEMORY ADDRESS GENERATOR
Filed July 22, 1968
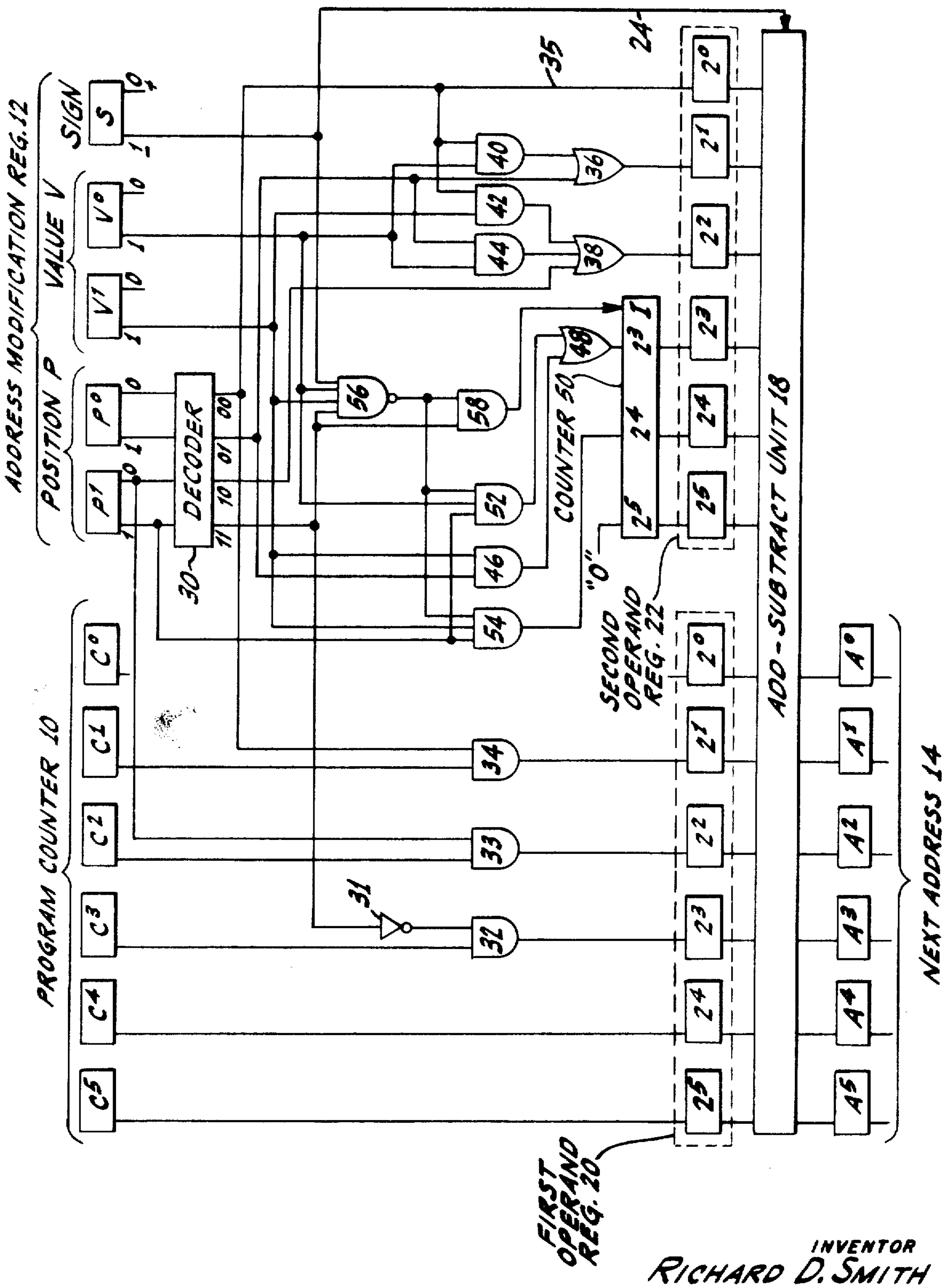
INVENTOR
RICHARD D. SMITH
BY Carl V. Olson
ATTORNEY United States Patent Office 3,530,439

Patented Sept. 22, 1970

3,530,439

COMPUTER MEMORY ADDRESS GENERATOR

Richard D. Smith, Moorestown, N.J., assignor to RCA Corporation, a corporation of Delaware Filed July 22, 1968, Ser. No. 746,513
Int. Cl. G11c 7/00
U.S. Cl. 340—172.5 5 Claims

ABSTRACT OF THE DISCLOSURE

An address generator, responsive to address modification information derived from an instruction, for generating a desired next memory address. The address modification information may consist of relatively few bits compared with the number of bits needed for the present address and the next address. The address generator includes logic for adding to or subtracting from the present address a number formed by positioning "value bits" of the address modification information at bit rank positions determined by the "position bits" of the address modification information. The new address may be any numerically nearby address, or any one of many more remote addresses, or one of fewer most remote addresses.

BACKGROUND OF THE INVENTION

In the operation of a computer, it is necessary to be able to access any one of the many word storage locations in the computer's random access memory. Memories having a large number of word storage locations require that an address for selecting any one of the locations be made up of an appropriately large number of binary bits. For example, a memory having 1,024 word storage locations requires an address having 10 binary bits. To give additional examples, 1,048,576 storage locations can be addressed by an address including twenty bits, and 134,217,728 memory word locations can be addressed by a memory including twenty-seven bits. In each case, the number of word storage locations is equal to 2 raised to the power of the number of bits in the address.

In the operation of a computer, it is customary to store successive instructions of the program in successive memory word storage locations. However, the order in which instructions are executed depends on results generated in the computer, which at decision points in the program determine the following sequence of instruction execution. Programs are normally written to utilize nearby memory storage locations as much as possible. However, the execution of a program may require the accessing of word storage locations at any place within the memory.

Instructions stored in a word location in the memory include address portions utilized for accessing data or the next instruction to be executed. When the memory contains many word storage locations, the portion of each instruction word required for addressing another word storage location becomes excessive. According to a previous example, 27 bits are necessary in an instruction word to address any other word in a memory containing 134,217,728 storage locations. It is therefore known to provide a number of base address registers in a computer for containing address bits that may be combined with address bits in an instruction to generate a complete address necessary to address the memory. In such an arrangement, additional hardware is necessary for the base registers and their controls, and the programming is also complicated by the need to control the address generating hardware.

SUMMARY OF THE INVENTION

It is a general object of this invention to provide an improved address generator which is economical to construct, which is convenient to use, which requires the assignment of relatively few address bits in an instruction, and which is capable of precisely addressing any nearby memory location, addressing any one of many more remote locations, and addressing any one of fewer remote locations in the memory.

BRIEF DESCRIPTION OF THE DRAWING

The sole figure of the drawing is a block diagram of an exemplary address generator constructed according to the teaching of the invention.

DESCRIPTION OF THE PREFERRED EMBODIMENT

The drawing shows a system for generating a six-bit address for any one of sixty-four memory locations. A program counter or program location counter 10 is a normal part of a conventional computer, and in the example it is a six-bit counter. An address generator utilizing the contents of the program counter 10 includes an address modification register 12 which includes a portion for two position bits P, a portion for two value bits V and a portion for a sign bit S. The output from the address generator is provided by a six-bit next address register 14.

The arrangement shown in the drawing for illustrating the invention is one in which addresses contain six bits for the addressing of any one of sixty-four different memory storage locations. The illustrated address generator utilizes five address modification bits derived from a staticized instruction. Five address modification bits are employed in the generation of a new six-bit next address. While the address modification register is almost as large as the program counter 10 and the next address register 14, this is because the memory capable of being addressed contains only 64 memory storage locations. In the actual practical use of the invention for addressing a large memory, the program counter 10 and the next address register 14 may include a large number of bits, such as 27 bits, and the address modification register may contain a much smaller number of bits, such as 16 bits. In this case, the address modification register may be divided into a position portion of 4 bits, a value portion of 11 bits, and a sign portion of 1 bit. The system illustrated in elementary form in the drawing is thus particularly advantageous when applied to the addressing of memories having a large number of memory storage locations.

The memory address generator shown in the drawing includes an add-substract unit 18 having a first operand input connected to the output of a first operand register 20, and having a second operand input connected to the output of a second operand register 22. The add-subtract unit 18 also has a control input 24 for a control signal which determines whether the unit 18 will perform addition or subtraction on the two operands. The unit 18 normally performs addition, and it performs subtraction when a "1" signal is applied from sign bit register S to input 24 of unit 18. The sum or difference produced by the add-subtract unit 18 is supplied to the next address register 14 for use by the associated computer.

The first operand supplied to the first operand register 20 consists of selected bits from the program counter 10 as controlled by the contents of the position portion P of the address modification register. The contents supplied to the second operand register 22 includes the contents of the value portion V of the address modification register 12, which is transferred at bit rank positions determined by the contents of the position portion P. In addition, when the position bits are not both "1's," a "1" bit is transferred to the second operand register 22 at a position one bit rank lower than the position to which the value bits are supplied. However, when the position bits are both "1's," the value bits are incremented by one. The sign bit S determines whether the unit 18 will perform addition or subtraction. In the case where all bits in the address modification register are "1's," (including a sign bit representing subtraction), the contents of the second operand register 22 is made to be all zeroes.

The above-described construction and operation of the address generator in the drawing is summarized in the following Table A which lists the first and second operands in terms of bits from the program counter 10 and the address modification register 12.

TABLE A

| | | | | | | |
|---|---|---|---|---|---|---|
| If $P^1P^0=00$: | | | | | | |
| Operand 1 | $=C^5$ | $C^4$ | $C^3$ | $C^2$ | $C^1$ | 0 |
| Operand 2 | $=\pm 0$ | 0 | 0 | $V^1$ | $V^0$ | 1 |
| Address | $=A^5$ | $A^4$ | $A^3$ | $A^2$ | $A^1$ | 1 |
| If $P^1P^0=01$: | | | | | | |
| Operand 1 | $=C^6$ | $C^4$ | $C^3$ | $C^2$ | 0 | 0 |
| Operand 2 | $=\pm 0$ | 0 | $V^1$ | $V^0$ | 1 | 0 |
| Address | $=A^5$ | $A^4$ | $A^3$ | $A^2$ | 1 | 0 |
| If $P^1P^0=10$: | | | | | | |
| Operand 1 | $=C^5$ | $C^4$ | $C^3$ | 0 | 0 | 0 |
| Operand 2 | $=\pm 0$ | $V^1$ | $V^0$ | 1 | 0 | 0 |
| Address | $=A^5$ | $A^4$ | $A^3$ | 1 | 0 | 0 |
| If $P^1P^0=11$ and $S=+$: | | | | | | |
| Operand 1 | $=C^5$ | $C^4$ | 0 | 0 | 0 | 0 |
| Operand 2 | $=+0$ | $V^1$ | $V^0$ | 0 | 0 | 0 |
| | $+0$ | 0 | 1 | 0 | 0 | 0 |
| Address | $=A^5$ | $A^4$ | $A^3$ | 0 | 0 | 0 |
| If $P^1P^0=11$ and $S=-$: | | | | | | |
| Operand 1 | $=C^5$ | $C^4$ | 0 | 0 | 0 | 0 |
| Operand 2 | $=-0$ | 0 | 0 | 0 | 0 | 0 |
| Address | $=A^5$ | $A^4$ | 0 | 0 | 0 | 0 |

The logic circuitry in the drawing for accomplishing the manipulations summarized in Table A will now be described. Each of the rectangles in the registers in the drawing represent a flip-flop having set and reset inputs on the top and having a "1" and "0" outputs on the bottom. Each flip-flop constitutes a storage location for a single binary bit.

The outputs of the position portion P flip-flops of the address modification register 12 are applied to a decoder 30 having four outputs labeled 00, 01, 10 and 11, any one of which is energized at a time depending on the contents of the position flip-flops P.

The outputs of the flip-flops $C^5$ and $C^4$ in the program counter 10 are directly coupled to the inputs of the $2^5$ and $2^4$ flip-flops in the first operand register 20. The contents of the flip-flop $C^3$ in counter 10 is coupled to the flip-flop $2^3$ in first operand register 20 solely when the output of decoder 30 is not 11. This is accomplished by the action of inverter 31 and "and" gate 32. The output of counter 10 flip-flop $C^2$ is applied to first operand flip-flop $2^2$ solely when the output of position flip-flop $P^1$ is 0, so that it enables "and" gate 33. The contents of counter flip-flop $C^1$ is coupled through "and" gate 34 to the first operand flip-flop $2^1$ solely when the output of decoder 30 is 00. The contents of counter flip-flop $C^0$ is not utilized by the address generator. The first operand flip-flop $2^0$ always contains a "0."

When the position bits $P^1P^0$ are both "0's," the 00 output of decoder 30 on line 35 causes a "1" to be set into second operand flip-flop $2^0$. When the position bits cause a 01 output from decoder 30, a "1" is set through "or" gate 36 into second operand flip-flop $2^1$. When the position bits cause a 10 output from decoder 30, a "1" is passed through "or" gate 38 to set second operand flip-flop $2^2$.

When the position bits P cause an output 00 from decoder 30, gate 40 is enabled to pass the contents of value flip-flop $V^0$ through "or" gate 36 to second operand flip-flop $2^1$, and "and" gate 42 is enabled to pass the contents of value flip-flop $V^1$ through "or" gate 38 to second operand flip-flop $2^2$.

When the position bits cause an output 01 from the decoder 30, "and" gate 44 is enabled to pass the contents of value flip-flop $V^0$ through "or" gate 38 to the second operand flip-flop $2^2$, and "and" gate 46 is enabled to pass the contents of value flip-flop $V^1$ through "or" gate 48 through the $2^3$ bit position in a counter 50 to the second operand flip-flop $2^3$.

The counter 50 includes flip-flops for three-bits labeled $2^5$, $2^4$ and $2^3$. The contents of the counter 50 may be incremented by 1 by the application of a "1" signal to the incrementing input I of the counter 50. The $2^5$ flip-flop in counter 50 does not have an external input, but rather is a storage position for a carry bit resulting from incrementing the counter.

When the position bits are 10 or 11, the "1" output of position flip-flop $P^1$ enables "and" gate 52 to pass the contents of value flip-flop $V^0$ through "or" gate 48 and flip-flop $2^3$ in counter 50 to the second operand flip-flop $2^3$. A "1" output from position flip-flop $P^1$ also enables "and" gate 54 to pass the contents of value flip-flop $V^1$ through the $2^4$ flip-flop of counter 50 to the second operand flip-flop $2^4$. Under these conditions the "and" gates 52 and 54 are invariably also enabled by the inverted output of "and" gate 56. "And" gate 56 is enabled solely when both position flip-flops $P^1P^0$ contain "1's," both value flip-flops $V^1V^0$ contain "1's" and the sign flip-flop S contains a "1" to represent a minus or subtraction function.

When the position bits $P^1P_0$ are 11 (providing an output 11 from decoder 30) and the value bits $V^1V^0$ and the sign bits S are not all "1's" (providing an output from inverting "and" gate 56), and "and" gate 58 is enabled to cause an incrementing by one of the contents of counter 50.

Referring back to Table A, it is seen that the first operand applied to the add-subtract unit 18 consists of varying numbers of high order bits from the program counter 10. Depending on the position bits P, the first operand consists of 5, 4, 3 or 2 of the highest order bits from the program counter 10, followed by "0's." This being so, the first operand represents the address of a word location which is at the beginning of a block of addresses including the address in the program counter. The new addresses are formed by adding or subtracting a second operand to or from a first operand representing the first address of a block of addresses.

There follows a Table B which lists the second operands applied to the add-subtract unit 18 with different combinations of position bits and value bits. Each second operand is listed in both its six-bit binary form and in its equivalent decimal number form.

TABLE B

| Position (bits) | Value (bits) | Second Operand: Binary | Second Operand: Decimal |
|---|---|---|---|
| 00 | 00 | 000 001 | 1 |
| 00 | 01 | 000 011 | 3 |
| 00 | 10 | 000 101 | 5 |
| 00 | 11 | 000 111 | 7 |
| 01 | 00 | 000 010 | 2 |
| 01 | 01 | 000 110 | 6 |
| 01 | 10 | 001 010 | 10 |
| 01 | 11 | 001 110 | 14 |
| 10 | 00 | 000 100 | 4 |
| 10 | 01 | 001 100 | 12 |
| 10 | 10 | 010 100 | 20 |
| 10 | 11 | 011 100 | 28 |
| 11 | 00 | 001 000 | 8 |
| 11 | 01 | 010 000 | 16 |
| 11 | 10 | 011 000 | 24 |
| 11 | 11 | [1] 100 000 | [1] 32 |
| 11 | 11 | [2] 000 000 | [2] 0 |

[1] When sign bit is +.
[2] When sign bit is −.

The information in Table B is listed in reordered form with second operands in numerical order in the following Table C:

TABLE C

| Position (bits) | Value (bits) | Second Operand Binary | Second Operand Decimal |
|---|---|---|---|
| 00 | 00 | 000 001 | 1 |
| 01 | 00 | 000 010 | 2 |
| 00 | 01 | 000 011 | 3 |
| 10 | 00 | 000 100 | 4 |
| 00 | 10 | 000 101 | 5 |
| 01 | 01 | 000 110 | 6 |
| 00 | 11 | 000 111 | 7 |
| 11 | 00 | 001 000 | 8 |
| 01 | 10 | 001 010 | 10 |
| 10 | 01 | 001 100 | 12 |
| 01 | 11 | 001 110 | 14 |
| 11 | 01 | 010 000 | 16 |
| 10 | 10 | 010 100 | 20 |
| 11 | 10 | 011 000 | 24 |
| 10 | 11 | 011 100 | 28 |
| 11 | 11 | [1] 100 000 | [1] 32 |
| 11 | 11 | [2] 000 000 | [2] 0 |

[1] When sign bit is +.
[2] When sign bit is −.

It can be seen from Table C that the second operand may have any one of the decimal values between 0 and 8, may have one-half of the decimal values between 9 and 16 and may have one-fourth of the decimal values between 17 and 32. The second operands, having the value shown, are added to or subtracted from, the first operand which represents the first address in a block of addresses including the address in program counter 10. Therefore, the add-subtract unit 10 can produce a new address which is any address within eight positions higher and eight positions lower than the first operand address. Also, the new address can be 10, 12, 14 or 16 positions above or below the first operand address. Additionally, the new address can be 20, 24, 28 or 32 positions above or below the first operand address.

It is therefore seen that the address generator of the invention economically permits addressing all of many nearby memory locations, many of the more remote locations, and fewer of the most remote locations. Thus, the address generator satisfies the programmer's need to precisely address all nearby memory locations, and to be able to jump with varying precision to remote locations anywhere in the memory. The advantages of the disclosed system are most impressive when applied to memory systems having a very large number of storage locations.

As listed at the end in Tables B and C, a "subtract" sign bit combined with 1, 1 position bits and 1, 1 value bits causes the generation of a second operand having a binary value 000 000, or a decimal value 0. This is accomplished in the drawing by the inverting "and" gate 56 which disables gates 58, 39, 52 and 54, and prevents the transfers therethrough of "1's" to the second operand register 22. The ability to generate a second operand equal to 0 permits the generation of an address representing the beginning of a block of addresses including the address in the program counter. When the second operand is equal to 0, the generated address is the same as the contents of the first operand register 20, and is the same as high order bits in the program counter 10 followed by "0's." The address generator may, of course, be differently implemented to utilize the contents of the first operand register 20 directly, if desired. Also, many other different but equivalent logic circuit arrangements may be employed in place of the one shown for accomplishing the described manipulations.

What is claimed is:

1. In a computer including a memory, and a program location counter for containing a given number of address bits required to address any one of many storage locations in the memory, an address generator comprising an address modification register for containing address modifying information derived from a staticized instruction and including a portion for position bits, a portion for value bits and a portion for a sign bit, an adder-subtractor unit having first and second operand inputs, an addition-subtraction control input and a new address output, means utilizing the contents of the position bits portion of said address modification register to transfer a thereby-determined number of high order bits from said program location counter to the first operand input of said adder-subtractor unit, and to transfer the contents of the value bits portion of said address modification register to the second operand input of said adder-subtractor unit in a bit rank position determined by said position bits, and means to transfer the contents of the sign bit portion of said address modification register to the control input of said adder subtractor unit to cause addition or subtraction of said operands and the generation of a new address, whereby a relatively small number of address modification bits are employed to generate a new address which can be any one of many numerically nearby address locations, or many of the more remote locations, or fewer of the most remote locations.

2. An address generator as defined by claim 1 and in addition means controlled by the contents of the position bits portion of said address modification register to conditionally transfer a "1" bit to the second operand input of said adder-subtractor unit at a bit rank position lower than said value bits.

3. An address generator as defined by claim 1 and in addition means controlled by the contents of the position bits portion of said address modification register to conditionally increment said value bits transferred to the second operand input of said adder-subtractor unit.

4. The combination as defined in claim 1 and, in addition, means responsive to a predetermined bit pattern in said address modification register to condition said adder-subtractor unit to produce a new address equal to the first operand input thereto.

5. The combination as defined in claim 1 and, in addition, means responsive to an all "1's" contents of the position portion and the value portion of said address modification register and to a "subtract" bit in the sign bit portion of the register to block the transfer of "1's" to said other operand input of said adder-subtractor unit.

References Cited

UNITED STATES PATENTS

| | | | |
|---|---|---|---|
| 3,160,858 | 12/1964 | Adams et al. | 340—172.5 |
| 3,277,446 | 10/1966 | Diamant et al. | 340—172.5 |
| 3,284,778 | 11/1966 | Trauboth | 340—172.5 |
| 3,331,056 | 7/1967 | Lethin et al. | 340—172.5 |
| 3,359,542 | 12/1967 | Macon et al. | 340—172.5 |

PAUL J. HENON, Primary Examiner

P. R. WOODS, Assistant Examiner